(12) United States Patent
Rowland

(10) Patent No.: US 8,757,698 B1
(45) Date of Patent: Jun. 24, 2014

(54) FLOOR MAT SYSTEM FOR VEHICLE

(71) Applicant: Ford Global Technologies, LLC, Dearborn, MI (US)

(72) Inventor: Jeffrey R. Rowland, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/956,646

(22) Filed: Aug. 1, 2013

(51) Int. Cl.
*B62D 25/20* (2006.01)

(52) U.S. Cl.
USPC ........................................ 296/97.23

(58) Field of Classification Search
USPC ........................................ 296/97.23
See application file for complete search history.

(56) References Cited

U.S. PATENT DOCUMENTS

| | | | | |
|---|---|---|---|---|
| 4,671,981 A * | 6/1987 | McLaughlin | .................... | 428/95 |
| 5,775,859 A * | 7/1998 | Anscher | ........................... | 411/38 |
| 6,250,001 B1 | 6/2001 | Gillespie | | |
| 7,125,595 B2 | 10/2006 | Kobayashi | | |
| 7,546,661 B2 * | 6/2009 | Connor, Jr. | ........................ | 16/4 |
| 7,727,612 B2 | 6/2010 | Haraguchi et al. | | |
| 7,908,708 B2 * | 3/2011 | Gelb et al. | .......................... | 16/4 |
| 7,945,992 B2 * | 5/2011 | Parisi et al. | ......................... | 16/4 |
| 8,122,567 B2 * | 2/2012 | Connor, Jr. | ........................ | 16/4 |
| 8,375,514 B2 * | 2/2013 | Dendo | ................ | 16/4 |
| 8,402,605 B2 * | 3/2013 | Courtin et al. | ...................... | 16/4 |
| 2012/0019022 A1 * | 1/2012 | Cianci | ........................ | 296/97.23 |
| 2012/0291227 A1 | 11/2012 | Fiedler | | |
| 2013/0313854 A1 * | 11/2013 | Johnson et al. | ............ | 296/97.23 |

FOREIGN PATENT DOCUMENTS

| | | | | |
|---|---|---|---|---|
| JP | 58112834 A | * | 7/1983 | |
| JP | 58112835 A | * | 7/1983 | |
| JP | 58112836 A | * | 7/1983 | |
| JP | 61050841 A | * | 3/1986 | |
| JP | 2012188056 A | * | 10/2012 | |
| KR | 2010003295 U | * | 3/2010 | |

* cited by examiner

*Primary Examiner* — H Gutman
(74) *Attorney, Agent, or Firm* — Vichit Chea

(57) ABSTRACT

A floor mat system is provided in a vehicle having a driver seat and driver foot pedals. A floor surface extends in front of the seat and beneath the foot pedals. A removable floor mat is comprised of a flexible sheet having a bottom surface for contacting the floor surface, a top surface, a forward end for installation juxtaposed with the pedals and a rearward end for installation juxtaposed with the seat. At least one mechanical non-magnetic retainer is disposed proximate to the rearward end to hold the floor mat to the floor surface. At least one self-aligning magnetic retainer is disposed proximate to the forward end to hold the floor mat to the floor surface.

19 Claims, 6 Drawing Sheets

FLOOR MAT SYSTEM FOR VEHICLE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to floor mats for motor vehicles, and, more specifically, to an attachment system for floor mats that is self-aligning, reliable, and cost effective.

Floor mats for motor vehicles such as cars and trucks are a popular option for protecting the permanent carpeting or floor from dirt, moisture, scuff marks, and other damage. Since they are removable, the floor mats can be cleaned or replaced as necessary.

It is very desirable to employ positive retention of floor mats onto the floor, especially for a driver's floor mat that runs underneath the brake and accelerator pedals used by the driver to operate the vehicle. A bunched up or misplaced floor mat could otherwise interfere with operation of the driver's pedals.

Shallow pile carpeting is a common floor surface in vehicles. In addition, relatively smooth molded floors made of vinyl material such as thermoplastic polyolefin (TPO) are commonly used in trucks. A molded floor may have a very low coefficient of friction, resulting in a greater tendency of a floor mat to slide. Therefore, various fasteners have been used in order to keep the floor mat in its intended position.

The floor mats should be easy to remove and then to reinstall after cleaning. To ensure that the user properly secures the floor mat, it should be easy to bring the fasteners into correct alignment and a successful interconnection should be easily detected by the user.

One commonly used fastener includes a post mounted on the floor and a corresponding eyelet on the floor mat for snapping onto the post. In one typical configuration, two fasteners are employed along the rearward end near opposite corners of the floor mat close to the driver's seat. Mechanical fasteners of this type can be made from injection-molded parts at a low cost.

In order to insure easy alignment and so that a proper installation can be visually determined by the user, a post opening in the eyelet may typically include a completely open passage through the floor mat. This arrangement allows the post to be visible at all times after installation of the floor mat, which may create an undesirable styling appearance. Thus, it may be more desirable to provide a closed, finished top surface on the eyelet resulting in a blind connector. Although a blind connector may increase the difficulty of aligning and installing the floor mat, it provides better sealing properties for preventing dirt and water from reaching the permanent flooring surface.

SUMMARY OF THE INVENTION

In one aspect of the invention, a floor mat system is provided in a vehicle having a driver seat and driver foot pedals. A floor surface extends in front of the seat and beneath the foot pedals. A removable floor mat is comprised of a flexible sheet having a bottom surface for contacting the floor surface, a top surface, a forward end for installation juxtaposed with the pedals and a rearward end for installation juxtaposed with the seat. At least one mechanical non-magnetic retainer is disposed proximate to the rearward end to hold the floor mat to the floor surface. At least one self-aligning magnetic retainer is disposed proximate to the forward end to hold the floor mat to the floor surface.

DETAILED DESCRIPTION OF PREFERRED EMBODIMENTS

Figure 1:
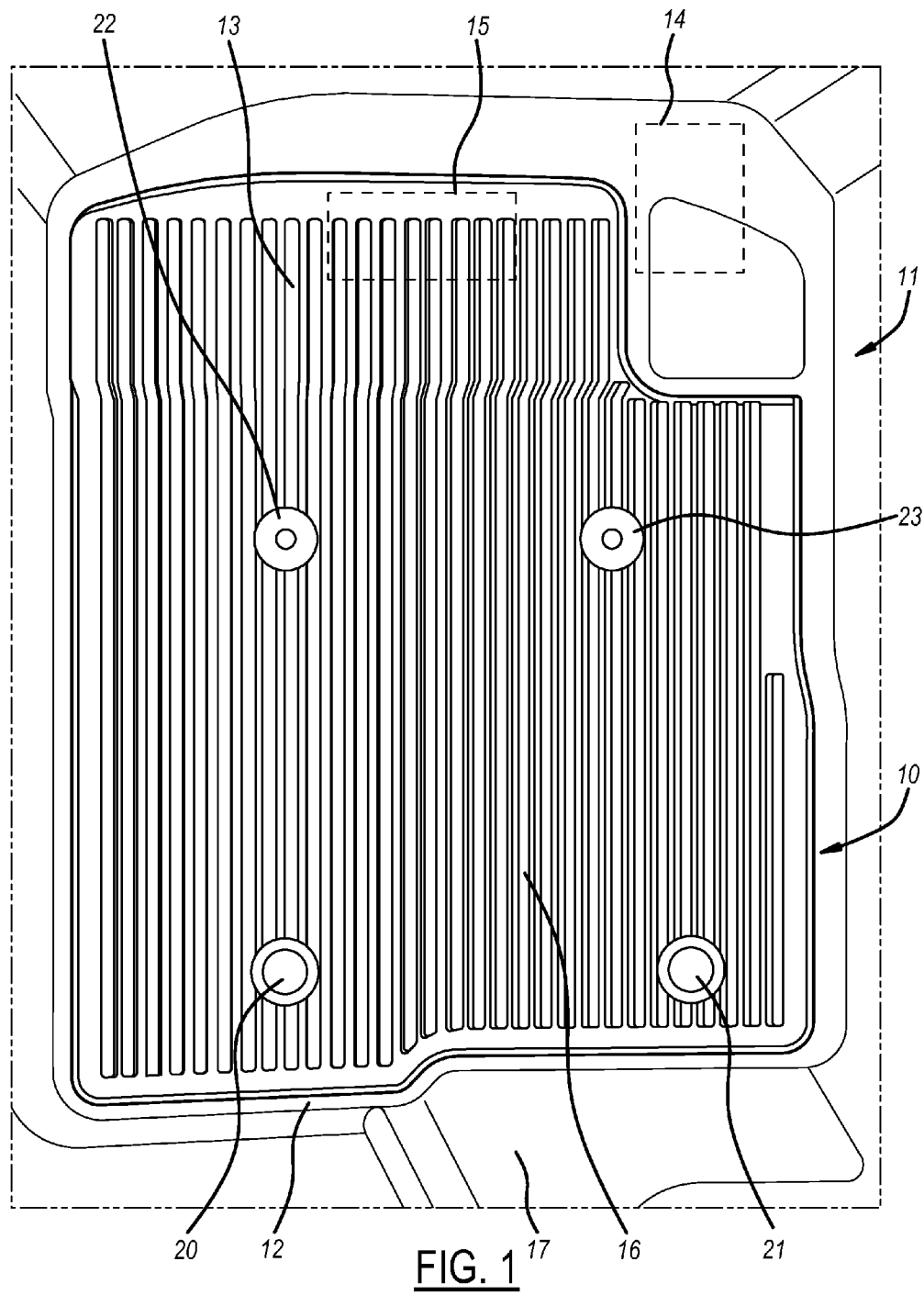
FIG. 1 is a plan view of a floor mat installed on a vehicle floor.

Referring now to FIG. 1, a floor mat 10 is comprised of a flexible sheet, such as rubber, polymer, or composite materials which may include a carpeted surface (not shown) or a ribbed surface as shown. Mat 10 lies within a floor well 11 upon a floor surface 12. A forward end 13 of mat 10 is installed juxtaposed with an accelerator pedal region 14 and a brake pedal region 15 as known in the art. Floor well 11 and floor surface 12 may typically slope upward beneath forward end 13. Mat 10 has a rearward end 16 for installation juxtaposed with a seat or a seating region 17.

In order to form a positive retention which is also easily removable, the floor mat system includes mechanical, non-magnetic retainers 20 and 21 disposed proximate to rearward end 16 in order to hold that end of mat 10 onto floor surface 12. In addition, a pair of self-aligning magnetic retainers 22 and 23 is disposed proximate to forward end 13 to hold mat in the proper position beneath pedal areas 14 and 15.

Magnetic retainers 22 and 23 are configured to be self-aligning and/or self-installing as described below. When installing floor mat 10, it may be slid into place and as long as magnetic retainers 22 and 23 approach within a predetermined distance of being aligned, the magnetic force of attraction automatically aligns and joins them together. Due to their alignment, the positions of mechanical retainers 21 and 22 simultaneously become properly aligned so that they can be more easily fastened—even when blind connectors are being used.

Figure 2:
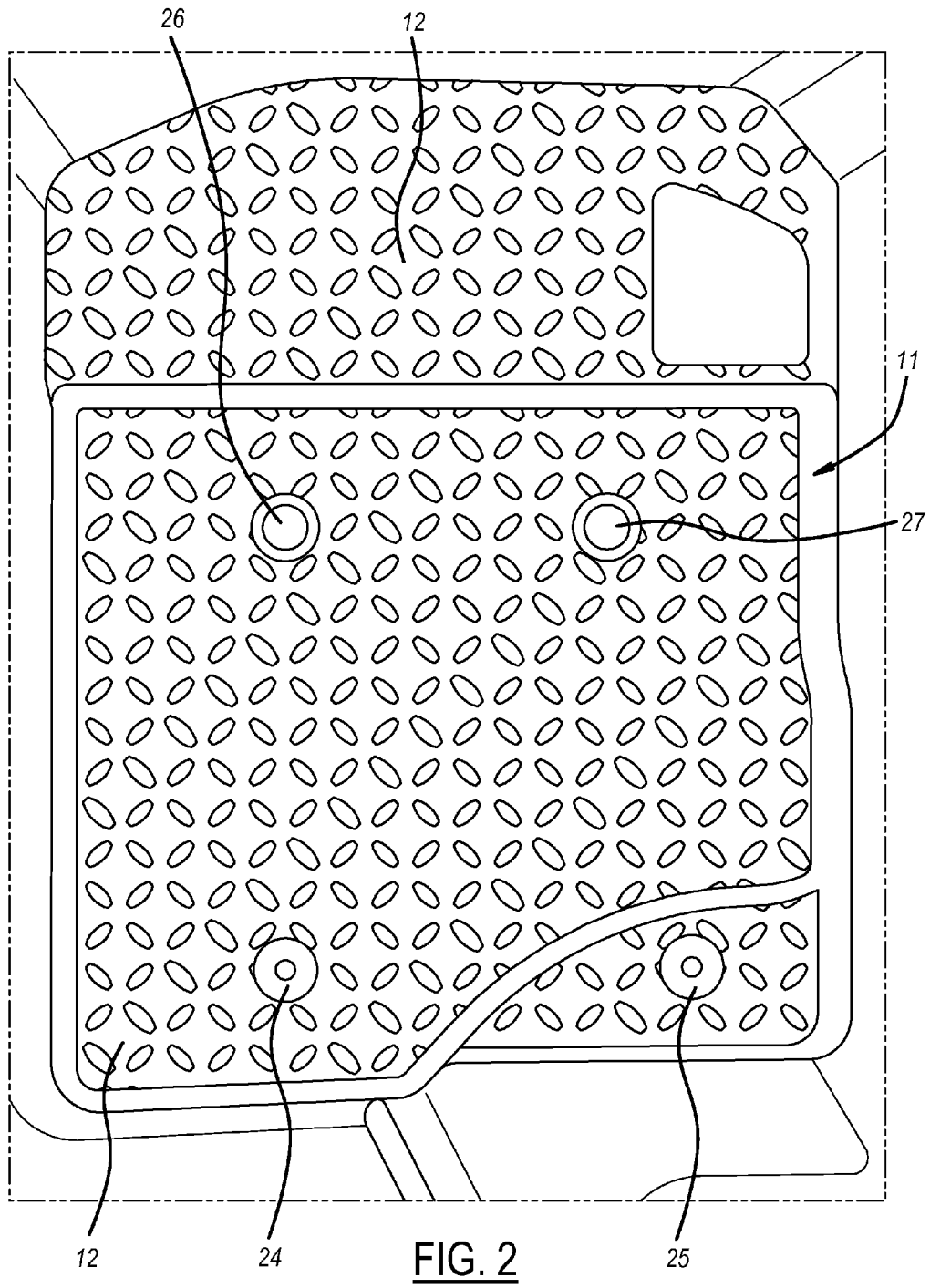
FIG. 2 is a plan view of the vehicle floor without a floor mat.

FIG. 2 shows floor well 11 and floor surface 12 with the floor mat removed. A pair of post members 24 and 25 comprises a portion of the mechanical non-magnetic retainers. Any conventional mechanical clip or clasping mechanism could be employed. Preferably, each mechanical retainer snaps together so that they are not easily dislodged during normal use.

Figure 3:
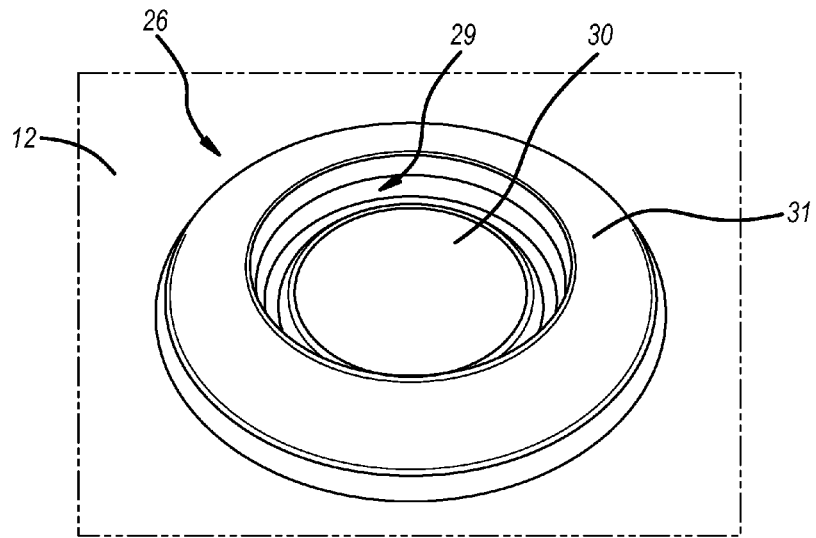
FIG. 3 is a perspective view of a floor anchor installed on the vehicle floor.

A pair of magnetic floor anchors 26 and 27 comprise the floor portion of the self-aligning magnetic retainers. Floor anchor 26 is shown greater detail in FIGS. 3-5. A magnetic mating surface 30 is surrounded by grommet 31 thereby providing a bounded receptacle area 29. Magnetic mating surface 30, the interior edge of grommet 31, and the shape of receptacle region 29 create a predetermined keyed shape that limits the possible positions and/or orientations in which the magnetic retainer can be installed.

Figure 4:
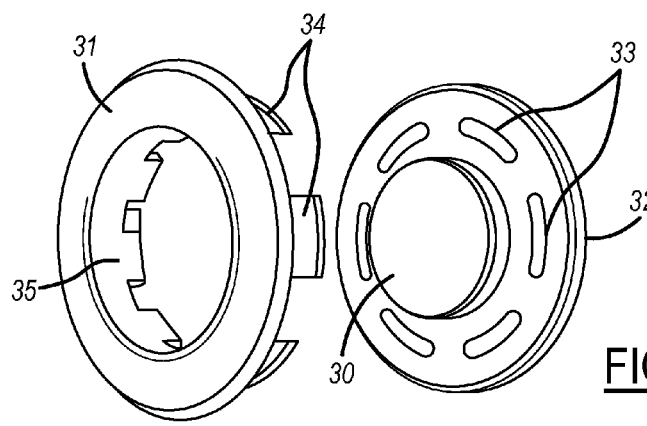
FIG. 4 is an exploded view of the floor anchor of FIG. 3.
Figure 5:
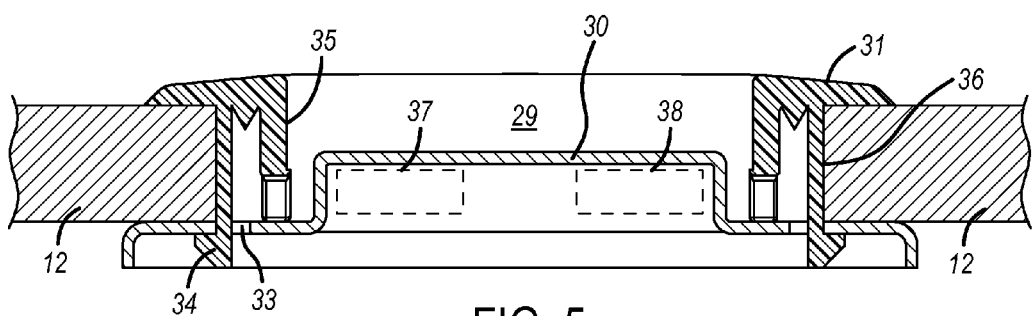
FIG. 5 is a vertical cross section of the floor anchor and floor.

As shown in FIG. 4, first mating surface 30 is carried by a clamp body 32 with a plurality of installation slots 33 deployed in a flange around surface 30. Grommet 31 includes a plurality of tab extensions 34 which are received through slots 33. For installation on floor 12, as shown in FIG. 5, body 32 is placed within a hole 36 from the underside of floor 12 and then grommet 31 is attached to body 31 by placing extension tabs 34 through hole 36 to join with slots 33. Thus, receptacle 29 is formed by sides 35 and mating surface 30 in order to receive a post member installed on the floor mat as described below. One or more permanent magnet elements 37/38 may also be incorporated beneath mating surface 30 if desired. Alternatively, the permanent magnets can be carried by the floor mats so that only a magnetically permeable mating surface would be required for mating surface 30.

Figure 6:
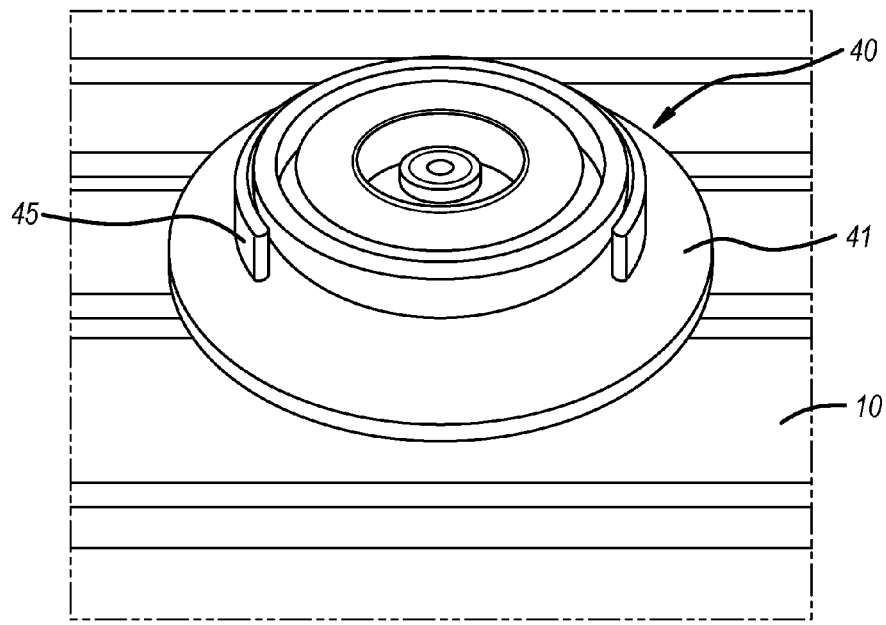
FIG. 6 is a bottom perspective view of a magnetic post member affixed to a bottom surface of the floor mat.
Figure 7:
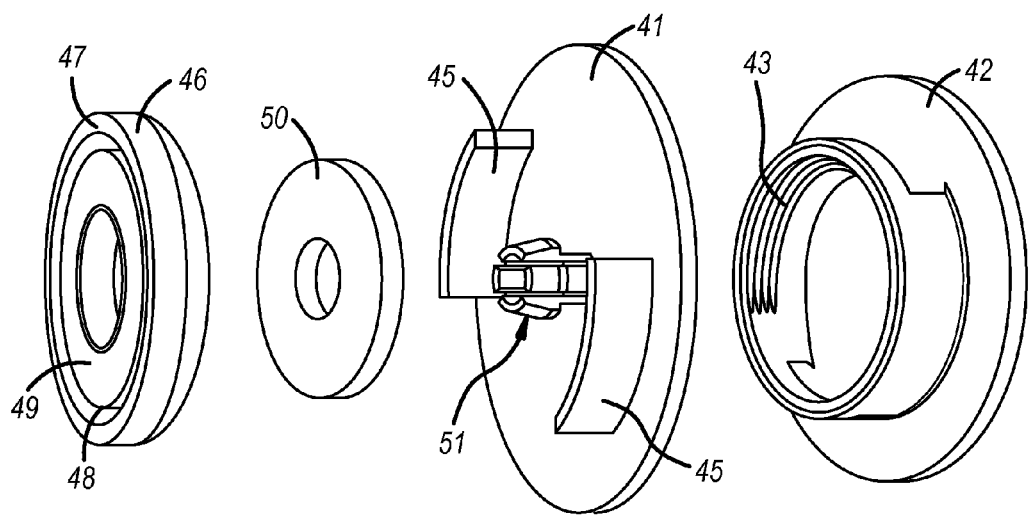
FIG. 7 is an exploded view of the post member of FIG. 6.
Figure 8:
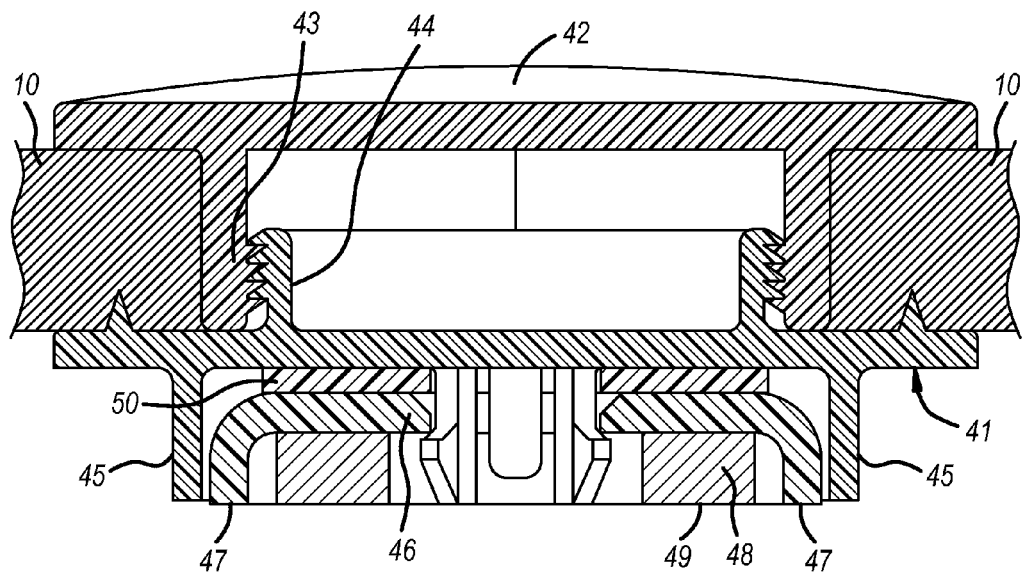
FIG. 8 is a vertical cross section of the post member and floor mat.

FIG. 6 shows a bottom surface of mat 10 to which a post member 40 has been affixed. A post carrier 41 is installed from the bottom surface of floor mat 10 to a cap member 42 which is installed from the top surface of mat 10 at a respective aperture in floor mat 10 (FIG. 8). Cap 42 has a threaded bore 43 that joins to a threaded collar 44 of carrier body 41. Carrier body 41 further includes post walls 45 extending away from the bottom surface of mat 10 defining a complimentary keyed shape for the post member to be received in receptacle 29 of the floor anchor. To achieve the magnetic attraction forces with the floor anchor, a metal shell 46 with a mating surface 47 includes a magnet ring 48 with a mating surface 49. A spacer 50 is inserted on a retention post mechanism 51 on carrier 41 along with shell 46 and magnet ring 48. Magnet ring 48 may be affixed to shell 46 by an adhesive, for example. Second mating surfaces 47/49 provide a relatively strong magnetic force of attraction so that when they are brought together with first mating surface 30 on the floor anchor, then an audible click is created when the surfaces mate together as a result of being pulled together quickly and with a large force of attraction.

Figure 9:
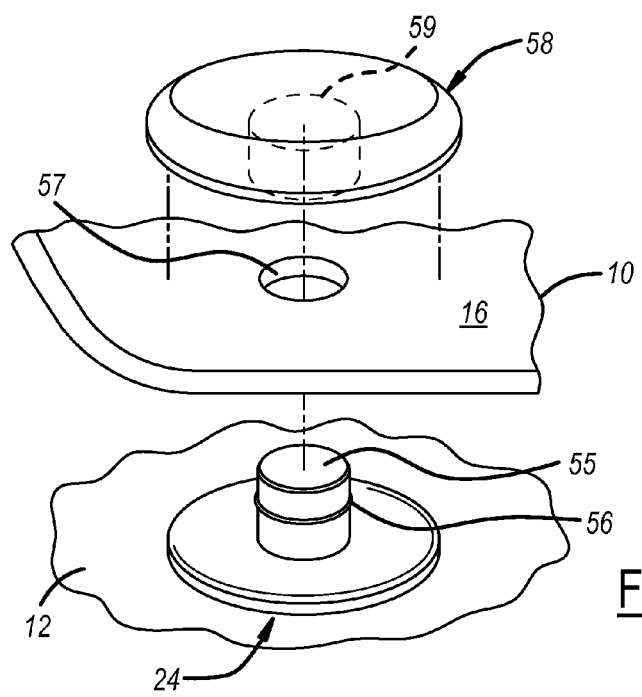
FIG. 9 is an exploded, perspective view of a mechanical non-magnetic retainer for holding a rearward end of the floor mat to the floor.

FIG. 9 shows mechanical non-magnetic retainer 24 in greater detail. A post 55 extends upwardly from floor surface 12 through a hole 57 in floor mat 10. A cap body 58 is joined to the top surface of mat 10 near rearward end 16 and has a female socket portion 59 for receiving male post 55 and its latching feature 56 as known in the art. By first installing the magnetic retainers (which is easily done since they are self-aligning), the user can easily make a snap connection between the snap connector elements without needing to see through a hole in the floor mat.

Figure 10:
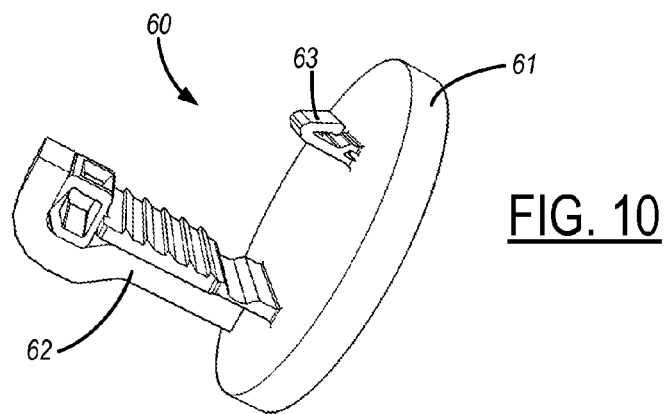
FIGS. 10 and 11 are perspective views of another embodiment of a floor anchor.
Figure 11:
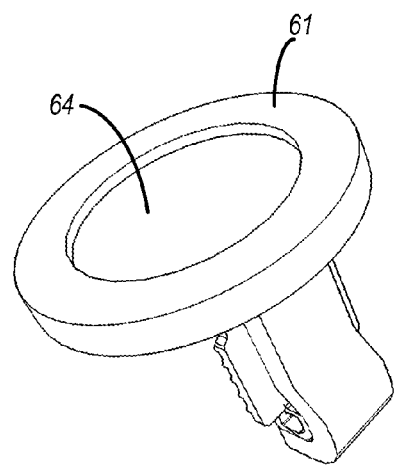

FIGS. 10 and 11 show another embodiment of a floor anchor. A molded plastic (e.g., nylon) body 60 includes an upper plate 61 and a pair of clip extensions 62 and 63 for interlocking with matching sockets in a floor (not shown). The top of plate 61 includes a recess into which a metal plate 64 is in-molded for receiving a magnetic clip on the floor mat (not shown).

Figure 12:
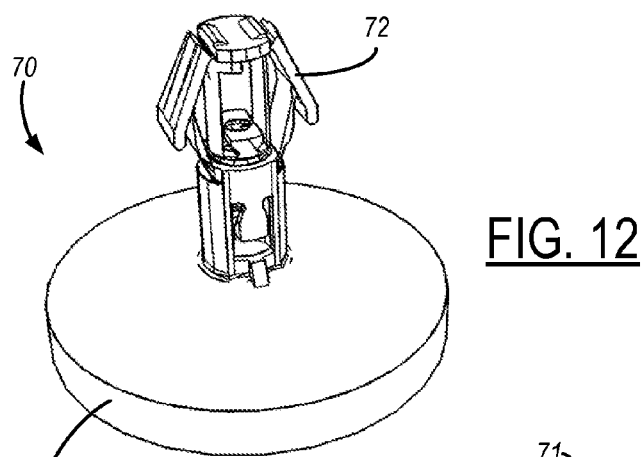
FIGS. 12 and 13 are perspective views of yet another embodiment of a floor anchor.
Figure 13:
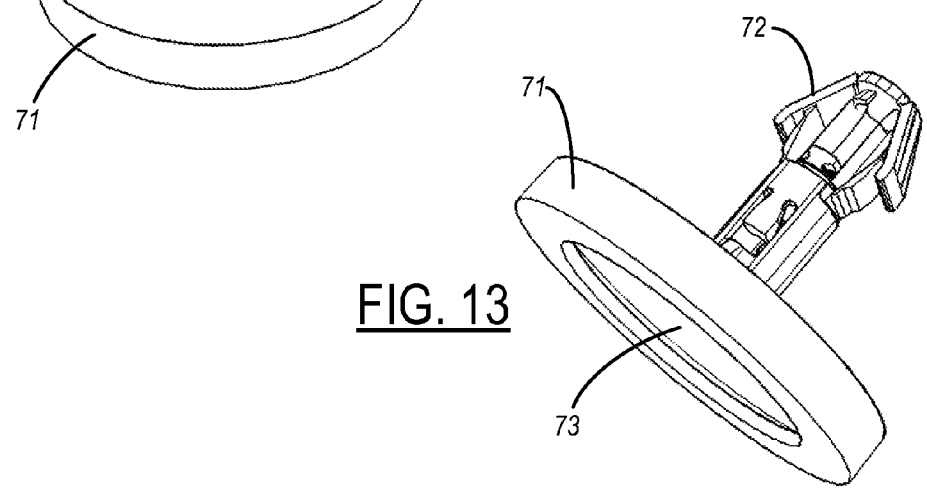

FIGS. 12 and 13 show yet another alternative embodiment of a floor anchor. A molded plastic (e.g., nylon) body 70 includes an upper plate 71 and a clip extension 72 for interlocking with a matching socket or aperture in a floor (not shown). The top of plate 71 likewise includes a recess into which a metal plate 73 is in-molded for receiving a magnetic clip on the floor mat (not shown).

A greater or lesser number of retainers can be used in the present invention. Preferably, only one or two of the retainers are magnetic retainers due to the added cost of the magnets. Thus, by combining the magnetic and non-magnetic retainers, a cost effective solution is obtained for reliably securing the floor mat in the desired position. Moreover, the floor mat system has a user friendly removal and installation process that increases the likelihood of being properly installed by the user.

What is claimed is:

1. A floor mat system for a vehicle having a driver seat and driver foot pedals, comprising:
   a floor surface extending in front of the seat and beneath the foot pedals;
   a removable floor mat comprised of a flexible sheet having a bottom surface for contacting the floor surface, a top surface, a forward end for installation juxtaposed with the pedals and a rearward end for installation juxtaposed with the seat;
   at least one mechanical non-magnetic retainer disposed proximate to the rearward end to hold the floor mat to the floor surface, wherein the mechanical retainer is comprised of a snap connector with a male portion affixed to the floor surface and a female portion affixed to the floor mat; and
   at least one self-aligning magnetic retainer disposed proximate to the forward end to hold the floor mat to the floor surface.

2. The system of claim 1 wherein the magnetic retainer is comprised of:
   a floor anchor affixed to the floor surface and having a first magnetic mating surface having a predetermined keyed shape; and
   a post member affixed to the floor mat and having a second magnetic mating surface extending from the bottom surface of the floor mat, wherein the second magnetic mating surface is complementary with the predetermined keyed shape.

3. The system of claim 2 wherein the floor anchor further comprises a grommet forming a receptacle around the first magnetic mating surface.

4. The system of claim 2 further comprising at least one permanent magnet member incorporated into at least one of the floor anchor and the post member.

5. The system of claim 2 wherein a magnetic force of attraction between the mating surfaces cause an audible click when the mating surfaces are brought together.

6. The system of claim 1 wherein a plurality of self-aligning magnetic retainers are disposed proximate to the forward end.

7. The system of claim 1 wherein a plurality of mechanical non-magnetic retainers are disposed proximate to the rearward end.

8. The system of claim 1 wherein the floor surface is comprised of a vinyl material.

9. A vehicle floor mat, comprising:
   a flexible sheet;
   a post member affixed to the flexible sheet having a magnetic mating surface with a self-aligning shape adapted to match a magnetic anchor surface affixed to the floor beneath driver pedals; and a female snap connector element affixed to the flexible sheet adapted to mate with a male snap connector element affixed to the floor proximate a driver seat.

10. The vehicle floor mat of claim 9 wherein the post member comprises a permanent magnet providing a sufficient magnetic force of attraction between the magnetic mating surface and the magnetic anchor surface to cause an audible click when the surfaces are brought together.

11. The vehicle floor mat of claim 9 comprising a plurality of post member affixed to the flexible sheet, each having a respective magnetic mating surface with a self-aligning shape adapted to match a respective magnetic anchor surface affixed to the floor beneath the driver pedals.

12. The vehicle floor mat of claim 9 comprising a plurality of female snap connector elements affixed to the flexible sheet, each adapted to mate with a respective male snap connector element affixed to the floor proximate a driver seat.

13. A floor mat system for a vehicle having a driver seat and driver foot pedals, comprising:
- a floor surface extending in front of the seat and beneath the foot pedals;
- a removable floor mat comprised of a flexible sheet having a bottom surface for contacting the floor surface, a top surface, a forward end for installation juxtaposed with the pedals and a rearward end for installation juxtaposed with the seat;
- at least one mechanical non-magnetic retainer disposed proximate to the rearward end to hold the floor mat to the floor surface; and
- at least one self-aligning magnetic retainer disposed proximate to the forward end to hold the floor mat to the floor surface, wherein the magnetic retainer is comprised of:
  - a floor anchor affixed to the floor surface and having a first magnetic mating surface having a predetermined keyed shape; and
  - a post member affixed to the floor mat and having a second magnetic mating surface extending from the bottom surface of the floor mat, wherein the second magnetic mating surface is complementary with the predetermined keyed shape.

14. The system of claim 13 wherein the floor anchor further comprises a grommet forming a receptacle around the first magnetic mating surface.

15. The system of claim 13 further comprising at least one permanent magnet member incorporated into at least one of the floor anchor and the post member.

16. The system of claim 13 wherein a magnetic force of attraction between the mating surfaces cause an audible click when the mating surfaces are brought together.

17. The system of claim 13 wherein a plurality of self-aligning magnetic retainers are disposed proximate to the forward end.

18. The system of claim 13 wherein a plurality of mechanical non-magnetic retainers are disposed proximate to the rearward end.

19. The system of claim 13 wherein the floor surface is comprised of a vinyl material.

\* \* \* \* \*